(12) United States Patent
Rozas

(10) Patent No.: US 6,738,893 B1
(45) Date of Patent: May 18, 2004

(54) METHOD AND APPARATUS FOR SCHEDULING TO REDUCE SPACE AND INCREASE SPEED OF MICROPROCESSOR OPERATIONS

(75) Inventor: Guillermo J. Rozas, Los Gatos, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/557,650

(22) Filed: Apr. 25, 2000

(51) Int. Cl.$^7$ .............................. G06F 9/30; G06F 9/44
(52) U.S. Cl. .................. 712/24; 712/245; 712/300; 717/132; 717/159; 717/161; 709/102
(58) Field of Search ...................... 712/300, 245, 712/227, 208, 210, 219, 24, 23, 244, 216, 41, 228; 717/141, 159, 161, 132; 709/102

(56) References Cited

U.S. PATENT DOCUMENTS 5,864,692 A  *  1/1999  Faraboschi et al. ......... 712/216
6,505,296 B2  *  1/2003  Morris et al. ............... 712/244

OTHER PUBLICATIONS

Intel Corp.; Basic Programming Model; "Registers;" pp. 8–23.

* cited by examiner

Primary Examiner—Daniel H. Pan

(57) ABSTRACT

A process for scheduling computer processor execution of operations in a plurality of instruction word formats including the steps of arranging commands into properly formatted instruction words beginning at one end into a sequence selected to provide the most rapid execution of the operations, and then rearranging the operations within the plurality of instruction words from the other end of the sequence into instruction words selected to occupy the least space in memory.

18 Claims, 2 Drawing Sheets

METHOD AND APPARATUS FOR SCHEDULING TO REDUCE SPACE AND INCREASE SPEED OF MICROPROCESSOR OPERATIONS

BACKGROUND OF THE INVENTION

1. Field of the Invention

This invention relates to computers and, more particularly, to a method for scheduling operations and instruction words for a very long instruction word (VLIW) microprocessor.

2. History of the Prior Art

A computer processor must receive the commands which it executes arranged in an instruction word format which the processor is capable of recognizing and utilizing. Most computer processors receive instructions for execution which have been generated from original source code by a compiler. One of the jobs of a compiler is to arrange the various instructions into proper formats and to place them in an order in which they may be rapidly executed by the particular processor. Normally, a compiler does this job statically as a part of the programming function long before a program is ready for execution. Once the compiler has finished, the code is simply run by a processor in the ultimate form furnished by the compiler.

Placing the instructions into the proper formats utilizes a process often referred to as "packing." A packing process looks at the different commands to be executed and determines which commands fit into instruction words of the various formats depending on the functional units which are available in a particular processor and the commands which each unit is able to execute. A packing process cooperates with a "scheduler" process which selects a sequence of instruction words including commands that will execute rapidly while meeting the constraints enforced by the packing process.

The constraints and dependencies which control scheduling execution of a program depend on both the software and the hardware. If a processor includes only one arithmetic and logic unit (ALU) and one floating point unit (FPU), then no more than one integer operation and one floating point operation can be scheduled to run at once. If a particular type of operation by one of the operating units takes some number of processor cycles and the unit is not fully pipelined, then another operation cannot be handled by that unit until the unit has completed operations already begun. And if an operation commanded by the software depends on the result of one or more earlier operations, then the earlier operations must complete before the later operation can start.

Some processors include hardware (called interlocks) which regulates those dependencies which are based upon the time required for each type of instruction to complete. Further, some processors such as reduced instruction set (RISC) processors utilize a single format for all operations. With processors which do both, scheduling requires simply arranging the packed instructions to meet the various software dependencies. Since all instructions are of the same length and the hardware takes care of timing dependencies, nothing further is required once the packing process has placed the commands into the fewest instructions possible. Scheduling for such a machine thus requires only determining a fast schedule.

However, some modern processors do not provide these features. For example, a very long instruction word (VLIW) processor includes a number of different functional units capable of processing a number of individual operations simultaneously. For example, one such processor includes two arithmetic and logic units (ALUs), a floating point unit (FPU), and a memory unit. The individual units perform their operations in parallel by responding to individual commands a number of which may be contained in a single instruction word. Typically, the commands include such functions as load, add, move, and store, each of which causes one of the many functional units to carry out the commanded operation.

In order to handle a number of operations at the same time in its different functional units, a VLIW processor must receive the commands in an instruction word arranged in a format which the VLIW processor is capable of recognizing and utilizing. One embodiment of a particular VLIW processor is capable of recognizing commands which appear in six different formats. Two of these formats each include four individual commands; while the remaining four formats each include two commands. In any of these formats, all commands occupy the same number of bits.

Because there are a number of different formats which are of different lengths, the effects of hardware and software constraints and dependencies are much more complicated in scheduling for a VLIW processor. This is especially true for processors which like the exemplary VLIW processor do not include hardware interlocks to assure that operation timing constraints for a first instruction word are met before executing succeeding commands.

With a limited number of instruction word formats, constraints on which operations may occur together, and a further requirement that instructions begin to execute only at selected intervals related to instruction word length, it is unusual for a scheduler and a packing process to be able to place commands in each available slot in all instruction words. Consequently, a scheduler for such a processor typically makes use of operations which do nothing ("no-ops") to fill the unused slots so that a processor will execute the program correctly. No-ops are also used to provide correct timing for operations with longer execution latencies. One prior art solution has been to schedule instruction words in a manner to minimize the amount of execution time (i.e., provide the smallest number of instruction words since each instruction word uses about the same amount of time) and then fill the schedule with a sufficient number of no-ops to take care of instruction formats.

This has at least one deleterious consequence. The space required to store code scheduled in this manner is larger than would be necessary if the no-ops were not necessary. Since instruction caches and, to a limited extent, memory have space limits which are rapidly reached, code which occupies more space is undesirable and executes more slowly.

Moreover, one particular VLIW processor executes programs designed for other "target processors." This VLIW processor receives its instructions in a form adapted to be executed by a target processor which typically has an entirely different instruction set than does the VLIW processor. The VLIW processor dynamically translates the stream of target instructions into instructions of its own host instruction set and stores those translated host instructions so that they may be executed without retranslation.

The translated instructions are commands representing operations that the functional units of the host VLIW processor can execute. Initially, these commands are generated in a linear sequential order and must be scheduled and packed into the long instruction words (i.e., instruction formats) recognizable by the host processor. Since the processor is dynamically translating target instructions into host instructions and executing those host instructions, the packing, scheduling, and other compiler functions take place "on-the-fly." This VLIW processor is described in detail in U. S. Pat. No. 5,832,205, Kelly et al issued Nov. 3, 1998, and assigned to the assignee of the present invention.

It is desirable to provide an improved process for scheduling instructions for a computer processor which is capable of recognizing a plurality of different length instruction word formats.

SUMMARY OF THE INVENTION

The present invention is realized by a method for scheduling of a sequence of operations for execution by a computer processor into a plurality of instruction word formats including the steps of arranging commands into properly formatted instruction words to provide the most rapid execution of the sequence, and arranging the operations within the plurality of instruction words to occupy the least space in memory.

These and other features of the invention will be better understood by reference to the detailed description which follows taken together with the drawings in which like elements are referred to by like designations throughout the several views.

DETAILED DESCRIPTION

The present invention has wide application for scheduling operations in computer systems having a plurality of instruction word formats of different lengths for obviating instruction execution latencies. The invention may be practiced by computers which dynamically translate instructions from one instructions set to another such as the VLIW processor-based computer discussed above. The invention may also be utilized by various programs used to compile source code written in various languages to run on any of a myriad of computers.

Figure 1:
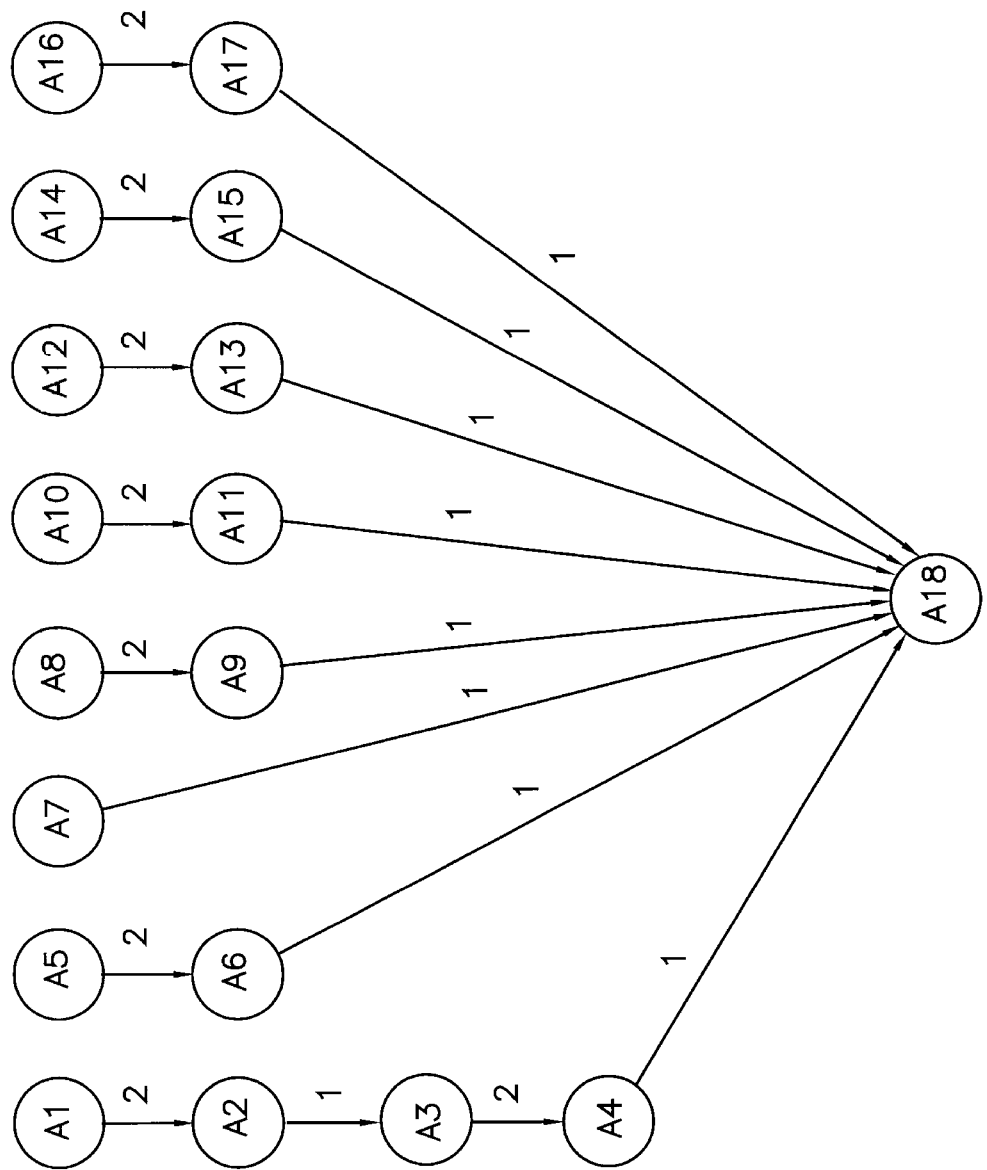
FIG. 1 is a directed acyclic graph illustrating a prior art scheduling process.

The typical method utilized by the prior art for scheduling a sequence of commands and instruction words when used by the above-described VLIW processor is illustrated in FIG. 1 assuming that the following eighteen commands (also referred to as "atoms") are to be scheduled.

Command ($A_n$) Sequence to be Scheduled:

| | |
|---|---|
| A1: | add t1, ebp, 12 |
| A2: | ld t2, [t1] |
| A3: | add t3, t2, 7 |
| A4: | st t3, [t1] |
| A5: | add t4, esp, −4 |
| A6: | st eax, [t4] |
| A7: | sub edi, ecx, ebx |
| A8: | add t5, esp, −8 |
| A9: | st ecx, [t5] |
| A10: | add t6, esp, −12 |
| A11: | st edx, [t6] |
| A12: | add t7, esp, −16 |

-continued

| | |
|---|---|
| A13: | st ebx, [t7] |
| A14: | add t8, esp, −20 |
| A15: | st eax, [t8] |
| A16: | add t9, esp, −24 |
| A17: | st ecx, [t9] |
| A18: | br next |

In this sequence, registers designated in the form t(n) are temporary registers of the host processor; the remaining register operands are from the X86 architecture, the target architecture in this example.

For the purpose of this illustration, it will be assumed that there are only two instruction formats. These formats are illustrated in Table 1. One of these is a sixteen-byte instruction format that can hold a memory operation, two ALU operations, and a branch operation. Sixteen-byte instructions must begin at byte addresses that are multiples of sixteen. A second is an eight-byte instruction format that can hold a memory operation and an ALU operation. Eight-byte instructions must begin at byte addresses that are multiples of eight.

TABLE 1

| | | | |
|---|---|---|---|

| | |
|---|---|

Additionally it will be assumed that the result of any load or ALU operation can be used in the next cycle by the ALU, but such result must wait an extra cycle before use as either an address or data by a load or store operation.

The method utilizes what is referred to as a directed acyclic graph for determining the commands to be provided in each sequentially issued instruction word. A data structure (node) is provided for each command which might be placed in an instruction word to detail the idiosyncrasies of that command. For example, a particular command may require four cycles to execute, may utilize the results of some other command as an operand, and may have other idiosyncrasies.

Directed edges connect nodes in the graph and represent scheduling constraints. If node A precedes node B, then command A must be scheduled prior to command B. Edges have integer weights that further constrain the schedule. A weight of value k on an edge from node A to node B indicates that command B must be scheduled at least k instructions (cycles) later than command A in the final schedule.

FIG. 1 illustrates the various commands in the above sequence A1–A18 which depend on one another and shows the various dependencies.

All of the commands which are available for inclusion in an instruction word are reviewed by the scheduling process. A command is available for scheduling when all of its predecessors in the directed acyclic graph have been scheduled, and when the current scheduling cycle count is such that all constraints given by weights on incoming edges are satisfied (i.e., all latencies from preceding commands are satisfied). From those commands available, the scheduler selects a command which does not depend on the results of any other command. If more than one such command exists, then the scheduler selects first the command which is most critical. The criticality is based on its effect on the other commands to be executed. One command is more critical than another when the scheduler predicts that issuing the former command earlier is likely to produce a better (i.e., shorter/more dense) schedule than issuing the latter command earlier. To determine criticality, schedulers often compute a priority function which assigns a priority number to each command. Then to determine the relative criticality of two nodes representing two commands, their priorities are compared numerically.

A place is reserved for the first command selected in a first instruction word to be initiated during a first cycle of operation. If additional commands are available which might also be placed into the first instruction word, an attempt is made by the scheduler using the packing process to fit them into the word. If an execution unit is available for the inclusion of a second command, then a place is reserved for the second command in the first instruction word.

A number of choices are made by the scheduler in determining the above schedule. In order to generate each next instruction word, the scheduler looks first at any remaining commands which might have been placed in the first instruction word and all additional commands which are available to be included in a second instruction word. The scheduling constraints for each of the commands in the first instruction word are considered to determine on what cycle a next instruction word may issue. In each case, the most critical command based on scheduling constraints is selected. That is, each command requires some number of cycles to execute. As may be seen, the first command A1 provides output which is used in the following command A2; command A2 which is a load cannot be started until at least two cycles have passed. On the other hand, the second command A2 provides output which is used in the following command A3, and command A3 provides output which is used in command A4. However, command A3 cannot be started until at least one cycle has passed after command A2 is completed; and command A4 which is a store using the results of command A3 cannot commence until two cycles after command. Because of these conditions, command A2 cannot be placed in an instruction words which commences before cycle 3, command A3 in an instruction word that commences before cycle 4, and command A4 in an instruction word that commences before cycle 6. Moreover, command A18 cannot be placed in an instruction word which commences before cycle 7.

When a cycle in which a next instruction word is to issue has been chosen, commands to include in that instruction word are selected in the manner described above. This process continues until there are no more commands available which are capable of being executed by execution units which are not already reserved or there are no more execution units free to execute available commands. When no more commands may be placed into the first instruction word, the instruction word is essentially "closed;" and the scheduling of a next instruction word commences.

A detailed explanation of such a scheduling technique is provided at Chapter 17, *Advanced Compiler Design & Implementation*, Steven S. Muchnick, published by Morgan Kaufmann.

Using this technique, the instruction words which have been generated function to execute as quickly as is possible for the particular processor. For example, the exemplary computer system provides instruction words capable of holding both two and four equal-length instructions shown in Table 1. Utilizing the prior art process described above, it would be typical to schedule a sequence of instruction words all of which provide space for four commands because the longer format holds more commands and thus requires fewer instruction words. Since each instruction word whether long or short requires approximately the same time to execute (apart from instruction cache/memory effects), a sequence of fewer instruction words generally requires the least time to execute.

When this prior art technique is applied to the sequence of operations listed above, the following cycle schedule is produced:

```
M1: add t1, ebp, 12 ; add t4, esp, −4
M2: add t5, esp, −8 ; add t6, esp, −12
M3: ld t2, [t1] ; add t7, esp, −16 ; add t8, esp, −20
M4: st eax, [t4] ; add t3, t2, 7 ; add t9, esp, −24
M5: st ecx, [t5] ; sub edi, ecx, ebx
M6: st t3, [t1]
M7: st edx, [t6]
M8: st ebx, [t7]
M9: st eax, [t8]
M10: st ecx, [t9]    ;         ; br next
```

As should be noted, in this prior art scheduling process, once the commands to be placed in an instruction word have been determined in the manner described, the instruction word will ultimately be generated and placed in line for execution. Presuming that four commands have been found which may be executed together in such an instruction word and that an instruction word format holding just these four commands is available, then the formation of the instruction word will be complete.

If, however, only three commands have been found which may be executed together in such an instruction word and that an instruction word format holding four commands is the only instruction word available for these commands, then the fourth command slot of the instruction word is filled with a no-op command. The naive format selection described above along with NOP insertion, assuming a starting address that is 8 mod 16 (e.g., 0xabcd8) and that sixteen-byte (four operation) instructions must be aligned to addresses that are 0 mod 16, the following sequence of instructions is scheduled:

```
M1: add t1, ebp, 12 ; add t4, esp, −4
M2: nop    ; add t5, esp, −8 ; add t6, esp, −12 ; nop
M3: ld t2, [t1]   ; add t7, esp, −16 ; add t8, esp, −20 ; nop
M4: st eax, [t4]     ; add t3, t2, 7        ; add t9, esp, −24    ; nop
M5: st ecx, [t5]     ; sub edi, ecx, ebx
M6: st t3, [t1]      ; nop
M7: st edx, [t6]     ; nop
M8: st ebx, [t7]     ; nop
M9: st eax, [t8]     ; nop               ; nop              ; nop
M10: st ecx, [t9]    ; nop               ; nop              ; br next
``` where instructions M2, M3, M4, and M10 are naturally wide (i.e., sixteen bytes each) due to the number of commands or the formats allowed (memory+branch only in a sixteen-byte instruction), instruction M2 has been widened to sixteen bytes because of the alignment restriction on instruction M3, and instruction M9 has been widened to sixteen bytes because of the alignment restriction on instruction M10.

It will be noted that in this prior art technique, since the instruction words are selected only to execute quickly, a number of no-op commands are utilized by VLIW processors to complete the instruction words. No-op commands for such processors must also be placed in instruction words during cycles in which latency requirements keep commands from being executed. The use of these no-op commands requires a significant amount of memory space both in system memory and in instruction caches. Ultimately, the use of storage space, especially instruction cache storage, to hold no-op commands slows overall program execution by the system.

The present invention improves the performance of the system by eliminating a significant portion of the no-op instructions required by prior art scheduling processes. The present invention accomplishes this result by scheduling commands into instruction words based on both execution time and space considerations.

In one embodiment of the invention, the process is carried out by placing space constraints on the filling of each instruction word. For example, in the exemplary VLIW computer system which provides instruction words capable of holding both two and four equal-length instructions, a constraint that no four command instruction word may issue unless it holds at least three commands will eliminate long format instruction words which do not make efficient use of instruction word space. When this additional constraint is added to the normal constraints of scheduling discussed above, the space occupied by sequences of instruction words will be reduced. Other criteria might also be applied which reduce the amount of space utilized.

One problem of this embodiment is that applying a constraint which eliminates the ability to utilize any number of instructions in any particular instruction word format may increase the execution time required by the scheduled sequence. For example, in order to fill all long format instruction words with at least three commands, it may be necessary to incur greater latencies between useful instruction words.

A second embodiment of the invention is designed to reduce the space utilized by a sequence of instruction words without increasing the execution time. In this embodiment, a first scheduling pass is made which may, like the prior art process in that the process, consider only the number of cycles required to execute the resulting sequence. However after the first scheduling pass for time has been completed, a second scheduling pass is undertaken using the results of the first pass. This second pass (shown in FIG. 2) uses the same number of instruction words as determined by the first pass so that the resulting sequence executes in the same time as would a sequence based only on the first scheduling pass. The second pass does not change any of the time constraints placed on the schedule by the execution latencies of the commands. However, the second pass begins at the opposite end of the sequence of instruction words, goes backward through the sequence, and optimizes the space required by the instruction words without perturbing the correct operation of the sequence by preserving all relevant latency constraints.

For example, the second pass reviews the proposed last instruction word of the sequence to determine if it includes any no-op commands. If, in reviewing the instruction word, the process finds one or more no-op commands, the process reviews the next to last instruction word in the proposed sequence to determine if there is a place reserved in that instruction word for a command which can be moved to the position in the last command presently reserved for a no-op without violating any of the constraints. The process may look as far back in the sequence of instruction words resulting from the first pass as is necessary to find any such command and move that command into the space reserved for the no-op command.

This second space pass of the process continues in the same manner back through the sequence finding no-ops in each preceding instruction word, looking for commands in earlier instruction words which might fill that position, and filling the no-op space if such commands exist. The result will often be a sequence of instruction words which takes less space in memory and caches. For example, the above-described sequence of commands; the naive format selection with NOP insertion, assuming a starting address that is 8 mod 16 (e.g., 0xabcd8) and that 16-byte (four operation) instructions must be aligned to addresses that are 0 mod 16 produces the following sequence:

| | | | |
|---|---|---|---|
| M1: add t1,ebp,12 | ; add t4, esp, −4 | | |
| M2: nop | ; add t5, esp, −8 | ; add t6, esp,−12 | ; nop |
| M3: ld t2, [t1] | ; add t7, esp, −16 | ; add t8, esp,−20 | ; nop |
| M4: st eax, [t4] | ; add t3, t2, 7 | ; add t9, esp,−24 | ; nop |
| M5: st ecx, [t5] | ; sub edi, ecx, ebx | | |
| M6: st t3, [t1] | ; nop | | |
| M7: st edx, [t6] | ; nop | | |
| M8: st ebx, [t7] | ; nop | | |
| M9: st eax, [t8] | ; nop | ; nop | ; nop |
| M10: st ecx, [t9] | ; nop | ; nop | ; br next |

Which occupies a total of 120 bytes of memory space.

The space pass operates after the cycle pass, from the last instruction to the first instruction. In this instance, it operates from instruction M10 towards instruction M1.

In the embodiment described, although proposed instruction word formats exist after the first time pass, the formats are not yet fixed. Consequently, a proposed short instruction word may be expanded to a long instruction word where useful to accomplish the purpose of reducing the space required by the scheduled sequence.

Looking at instruction M10, there is only one command that can be moved there, namely the subtract command (A7) originally positioned in instruction M5 can be moved there because nothing depends on it in the schedule.

Thus after processing instruction M10, the new schedule is:

| | | | |
|---|---|---|---|
| M1: | ; add t1, ebp, 12 | ; add t4, esp, −4 | |
| M2: | ; add t5, esp, −8 | ; add t6, esp,−12 | |
| M3: ld t2, [t1] | ; add t7, esp, −16 | ; add t8, esp,−20 | |
| M4: st eax, [t4] | ; add t3, t2, 7 | ; add t9, esp,−24 | |
| M5: st ecx, [t5] | | | |
| M6: st t3, [t1] | | | |
| M7: st edx, [t6] | | | |
| M8: st ebx, [t7] | | | |
| M9: st eax, [t8] | | | |
| M10: st ecx, [t9] | ; sub edi, ecx, ebx ; | | ; br next |

Processing instruction M9 shows that there is nothing that can be moved, so the schedule remains the same.

Next, there is one command that can be moved to M8, namely the command originally placed in instruction M4 that computes t9 (A16), since by moving the command to this position, the latency for t9 (to store in instruction M10) is still satisfied. No other command can be moved into instruction M8. Thus, the new schedule after processing M8 is:

| | | | |
|---|---|---|---|
| M1: | ; add t1, ebp, 12 | ; add t4, esp, −4 | |
| M2: | ; add t5, esp, −8 | ; add t6, esp,−12 | |
| M3: ld t2, [t1] | ; add t7, esp, −16 | ; add t8, esp,−20 | |
| M4: st eax, [t4] | ; add t3, t2, 7 | ; | |
| M5: st ecx, [t5] | | | |
| M6: st t3, [t1] | | | |
| M7: st edx, [t6] | | | |

-continued

| | | |
|---|---|---|
| M8: st ebx, [t7] | ; add t9, esp, −24 | |
| M9: st eax, [t8] | | |
| M10: st ecx, [t9] | ; sub edi, ecx, ebx ; | ; br next |

Similarly, the command that computes t8 (A14) can be moved from instruction M3 into instruction M7, the command computing t7 (A12) can be moved from instruction M3 into instruction M6, and the command computing t6 (A10) can be moved from instruction M2 into instruction M5.

Thus, after processing instruction M5 in the space pass, the schedule is:

| | | |
|---|---|---|
| M1: | ; add t1, ebp, 12 | ; add t4, esp, −4 |
| M2: | ; add t5, esp, −8 | |
| M3: ld t2, [t1] | | |
| M4: st eax, [t4] | ; add t3, t2, 7 | |
| M5: st ecx, [t5] | ; add t6, esp, −12 | |
| M6: st t3, [t1] | ; add t7, esp, −16 | |
| M7: st edx, [t6] | ; add t8, esp, −20 | |
| M8: st ebx, [t7] | ; add t9, esp, −24 | |
| M9: st eax, [t8] | | |
| M10: st ecx, [t9] | ; sub edi, ecx, ebx ; | ; br next |

Continuing in this manner, no command can be moved to it from an earlier instruction when processing instruction M4. However when processing instruction M3, the command computing t5 (A8) can be moved to it, leaving instruction M2 empty. When processing instruction M2, we find that the command computing t4 (A5) can be moved to it, so the final schedule is:

| | | |
|---|---|---|
| M1: | ; add t1, ebp, 12 | |
| M2: | ; add t4, esp, −4 | |
| M3: ld t2, [t1] | ; add t5, esp, −8 | |
| M4: st eax, [t41 | ; add t3, t2, 7 | |
| M5; st ecx, [t5] | ; add t6, esp, −12 | |
| M6; st t3, [t1] | ; add t7, esp, −16 | |
| M7: st edx, [t6] | ; add t8, esp, −20 | |
| M8: st ebx, [t7] | ; add t9, esp, −24 | |
| M9: st eax, [t8] | | |
| M10: st ecx, [t9] | ; sub edi, ecx, ebx ; | ; br next |

When the scheduler now chooses formats with NOP insertion, again subject to the constraints above, the results are:

| | | | | |
|---|---|---|---|---|
| M1: nop | ; add t1, ebp, 12 | | | |
| M2: nop | ; add t4, esp, −4 | | | |
| M3: ld t2, [t1] | ; add t5, esp, −8 | | | |
| M4: st eax, [t41 | ; add t3, t2, 7 | | | |
| M5; st ecx, [t5] | ; add t6, esp, −12 | | | |
| M6: st t3, [t1] | ; add t7, esp, −16 | | | |
| M7: st edx, [t6] | ; add t8, esp, −20 | | | |
| M8: st ebx, [t7] | ; add t9, esp, −24 | | | |
| M9: st eax, [t8] | ; nop | | | |
| M10: st ecx, [t9] | ; sub edi, ecx, ebx | ; nop | ; br next | | where instruction M10 is both naturally wide and aligned properly (remember that the assumption that start is at an address that is 8 mod 16).

The total space required for the modified sequence is:

| | |
|---|---|
| Nine 8-byte instructions | = 72 bytes |
| One 16-byte instruction | = 16 bytes |
| Total | = 88 bytes |

This achieves almost a one-third reduction in the space required in memory and the instruction cache.

In the embodiment described, a proposed short instruction word may be expanded to a long instruction word where useful to accomplish the purpose of reducing the space required by the scheduled sequence. Other similar considerations may be utilized in deciding whether to move a command from one instruction word to another.

Figure 2:
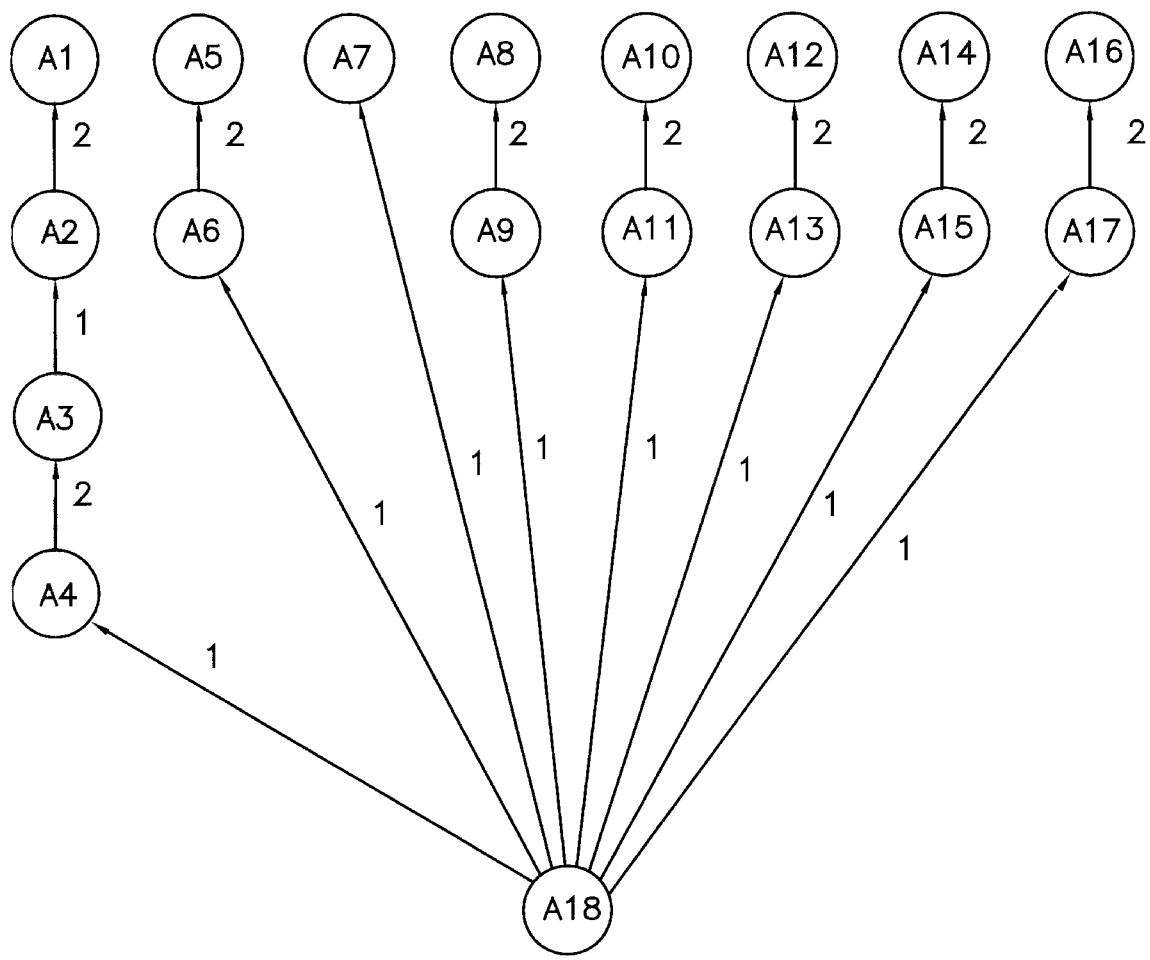
FIG. 2 is a directed acyclic graph used in one embodiment of a scheduling process designed in accordance with the present invention.

In order to assure that the time constraints established by the various edge conditions remain in place while undertaking a second space pass through the scheduling process, it is useful to simply reverse the conditions formulated on the first pass, i.e., reverse the directed acyclic graph shown in FIG. 2.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A process for scheduling computer processor execution of commands in a plurality of instruction word formats comprising:
   arranging commands into properly formatted instruction words beginning at one end into a sequence selected to provide the most rapid execution of the operations; and
   rearranging the commands within the plurality of instruction words from another end of the sequence into instruction words selected to occupy the least space in memory, said rearranging comprises determining if said commands include a do nothing operation (no-op) command.

2. The process as described in claim 1, wherein the number of said plurality of instruction words is the same after said rearranging.

3. The process as described in claim 1, wherein said rearranging preserves any execution latency of said commands.

4. The process as described in claim 1, wherein said rearranging further comprises:
   determining if a previous instruction word of said plurality of instruction words includes a command which can be moved to a subsequent instruction word without violating any execution latency of said commands.

5. The process as described in claim 1, wherein said rearranging further comprises:
   determining if a previous instruction word of said plurality of instruction words includes a command which can be moved to a subsequent instruction word without violating any execution latency of said commands, provided said commands include said do nothing operation command.

6. The process as described in claim 1, wherein said rearranging further comprises:
   expanding a short instruction word of said plurality of instruction words to a long instruction word.

7. A process for scheduling computer processor execution of commands in a plurality of instruction word formats, said process comprising:

arranging commands into a properly formatted plurality of instruction words to provide a sequence selected to provide the most rapid execution of the operations; and rearranging said commands within said plurality of instruction words beginning at a last command of said sequence into instruction words selected to occupy the least space in memory, said rearranging comprises determining if said commands include a do nothing operation (no-op) command, said rearranging preserves any execution latency of said commands.

8. The process as described in claim 7, wherein the number of said plurality of instruction words is the same after said rearranging.

9. The process as described in claim 8, wherein said rearranging further comprises:

determining if a previous instruction word of said plurality of instruction words includes a command which can be moved to a subsequent instruction word.

10. The process as described in claim 7, wherein said rearranging further comprises:

determining if a previous instruction word of said plurality of instruction words includes a command which can be moved to a subsequent instruction word.

11. The process as described in claim 7, wherein said rearranging further comprises:

determining if a previous instruction word of said plurality of instruction words includes a command which can be moved to a subsequent instruction word, provided said commands include said do nothing operation command.

12. The process as described in claim 7, wherein said rearranging further comprises:

expanding a short instruction word of said plurality of instruction words to a long instruction word.

13. A process for scheduling computer processor execution of commands in a plurality of instruction word formats, said process comprising:

arranging commands into a plurality of instruction words that include said plurality of instruction word formats to provide a sequence selected to provide the most rapid execution of the operations; and rearranging said commands within said plurality of instruction words beginning at a last command of said sequence into instruction words selected to occupy the least space in memory, said rearranging comprises determining if said commands include a do nothing operation (no-op) command, said rearranging preserves any execution latency of said commands.

14. The process as described in claim 13, wherein the number of said plurality of instruction words is the same after said rearranging.

15. The process as described in claim 14, wherein said rearranging further comprises:

determining if a previous instruction word of said plurality of instruction words includes a command which can be moved to a later instruction word.

16. The process as described in claim 13, wherein said rearranging further comprises:

determining if a previous instruction word of said plurality of instruction words includes a command which can be moved to a later instruction word.

17. The process as described in claim 13, wherein said rearranging further comprises:

determining if a previous instruction word of said plurality of instruction words includes a command which can be moved to replace a no-op command of a later instruction word.

18. The process as described in claim 13, wherein said rearranging further comprises:

expanding a short instruction word of said plurality of instruction words to a long instruction word.

* * * * *